(12) United States Patent
Akiba et al.

(10) Patent No.: US 12,400,318 B2
(45) Date of Patent: Aug. 26, 2025

(54) CIRCUIT DEVICE AND ERROR DETECTION METHOD

(71) Applicant: SEIKO EPSON CORPORATION, Tokyo (JP)

(72) Inventors: Yasutoshi Akiba, Chino (JP); Jeffrey Eric, Richmond (CA)

(73) Assignee: SEIKO EPSON CORPORATION (JP)

( * ) Notice: Subject to any disclaimer, the term of this patent is extended or adjusted under 35 U.S.C. 154(b) by 492 days.

(21) Appl. No.: 17/901,097

(22) Filed: Sep. 1, 2022

(65) Prior Publication Data

US 2023/0070936 A1 Mar. 9, 2023

(30) Foreign Application Priority Data

Sep. 6, 2021 (JP) .................................. 2021-144493

(51) Int. Cl.
*G06T 7/00* (2017.01)
*G06T 7/73* (2017.01)

(52) U.S. Cl.
CPC ............... *G06T 7/001* (2013.01); *G06T 7/74* (2017.01)

(58) Field of Classification Search
CPC .... G06T 7/74; G06T 5/00; G06T 5/80; G06T 2207/30168; G06T 7/001
See application file for complete search history.

(56) References Cited

U.S. PATENT DOCUMENTS

| 6,122,412 | A  | * | 9/2000  | Noguchi ............... H04N 1/047 |
|           |    |   |         | 382/312                           |
| 11,055,833 | B2 | * | 7/2021 | Anand ...................... G06T 7/13 |
| 12,210,426 | B2 | * | 1/2025 | Akiba .................... G09G 5/006 |
| 2002/0094028 | A1 | * | 7/2002 | Kimoto ............... H04N 19/107 |
|           |    |   |         | 375/E7.176                        |
| 2014/0225941 | A1 | * | 8/2014 | Van der Vleuten ... G09G 5/006 |
|           |    |   |         | 345/690                           |
| 2017/0330308 | A1 | * | 11/2017 | Chen ......................... G06T 5/70 |
| 2019/0065877 | A1 | * | 2/2019 | Kalyuzhny ........... G06F 18/254 |
| 2019/0266711 | A1 | * | 8/2019 | Anand .................. G06T 7/0002 |
| 2020/0201035 | A1 | * | 6/2020 | Anand .............. G02B 27/0101 |
| 2020/0334795 | A1 | * | 10/2020 | Wu ..................... G02B 27/0101 |
| 2020/0342567 | A1 |   | 10/2020 | Eric et al. |
| 2021/0012853 | A1 |   | 1/2021 | Murozuka |
| 2021/0019867 | A1 | * | 1/2021 | Hayashi ............. G02B 27/0101 |
| 2022/0276339 | A1 | * | 9/2022 | Ma .......................... G01S 7/406 |

(Continued)

FOREIGN PATENT DOCUMENTS

| JP | 2019-149760 A | 9/2019 |
| JP | 2019-168749 A | 10/2019 |
| JP | 2020-184059 A | 11/2020 |

*Primary Examiner* — Wesley J Tucker
(74) *Attorney, Agent, or Firm* — Harness, Dickey & Pierce, P.L.C.

(57) ABSTRACT

A circuit device includes a storage circuit, an image conversion circuit, and an error detection circuit. The storage circuit stores received first image data. The image conversion circuit executes an image conversion by a coordinate conversion on the first image data by outputting a reference coordinate indicating a pixel position on the first image data and outputting second image data based on pixel data that is read from the storage circuit based on the output reference coordinate. The error detection circuit executes error detection on the reference coordinate output by the image conversion circuit.

9 Claims, 10 Drawing Sheets

(56) References Cited

U.S. PATENT DOCUMENTS

| | | | |
|---|---|---|---|
| 2023/0140777 A1* | 5/2023 | Kobayashi | G09G 3/002 345/647 |
| 2023/0206814 A1* | 6/2023 | Akiba | G09G 5/005 345/690 |
| 2025/0053768 A1* | 2/2025 | Decoux | G06K 19/06075 |

* cited by examiner

| CORRECTION PARAMETER | EXPECTED VALUE OF ERROR CODE VALUE |
|---|---|
| WP1 | CDEX1 |
| WP2 | CDEX2 |
| ⋮ | ⋮ |
| WPn | CDEXn |

CIRCUIT DEVICE AND ERROR DETECTION METHOD

The present application is based on, and claims priority from JP Application Serial Number 2021-144493, filed Sep. 6, 2021, the disclosure of which is hereby incorporated by reference herein in its entirety.

BACKGROUND

1. Technical Field

The present disclosure relates to a circuit device, an error detection method, and the like.

2. Related Art

JP-A-2019-149760 discloses a circuit device including an image processing circuit and a comparison circuit. The image processing circuit maps a received first image to a second image and converts the second image into a third image by inverse mapping. The comparison circuit executes error detection on the second image by comparing the first image with the third image. Specifically, the comparison circuit compares the first image with the third image by comparing image values or visibility indexes of edge images.

In JP-A-2019-149760, it is possible to execute the error detection on the second image, but it may be difficult to detect an abnormality with high accuracy in detecting an abnormality in the image processing circuit. Specifically, since the third image after the inverse mapping does not completely return to the first image which is an original image, the comparison includes ambiguity. Although there is no problem in checking whether a content of the second image is appropriate, ambiguity remains in detecting the abnormality in the image processing circuit.

SUMMARY

An aspect of the present disclosure relates to a circuit device including: a storage circuit configured to store received first image data; an image conversion circuit configured to execute an image conversion by a coordinate conversion on the first image data by outputting a reference coordinate indicating a pixel position on the first image data and outputting second image data based on pixel data that is read from the storage circuit based on the output reference coordinate; and an error detection circuit configured to execute error detection on the reference coordinate output by the image conversion circuit.

Another aspect of the present disclosure relates to an error detection method including: storing first image data in a storage circuit; executing an image conversion by a coordinate conversion on the first image data and outputting second image data after the image conversion; in the image conversion, outputting a reference coordinate indicating a pixel position on the first image data and outputting the second image data based on pixel data that is read from the storage circuit based on the output reference coordinate; and executing error detection on the output reference coordinate.

DESCRIPTION OF EXEMPLARY EMBODIMENTS

Hereinafter, preferred embodiments of the present disclosure will be described in detail. The present embodiment to be described later does not unduly limit contents described in claims, and all configurations described in the present embodiment are not necessarily essential constituent elements.

1. First Configuration Example

Figure 1:
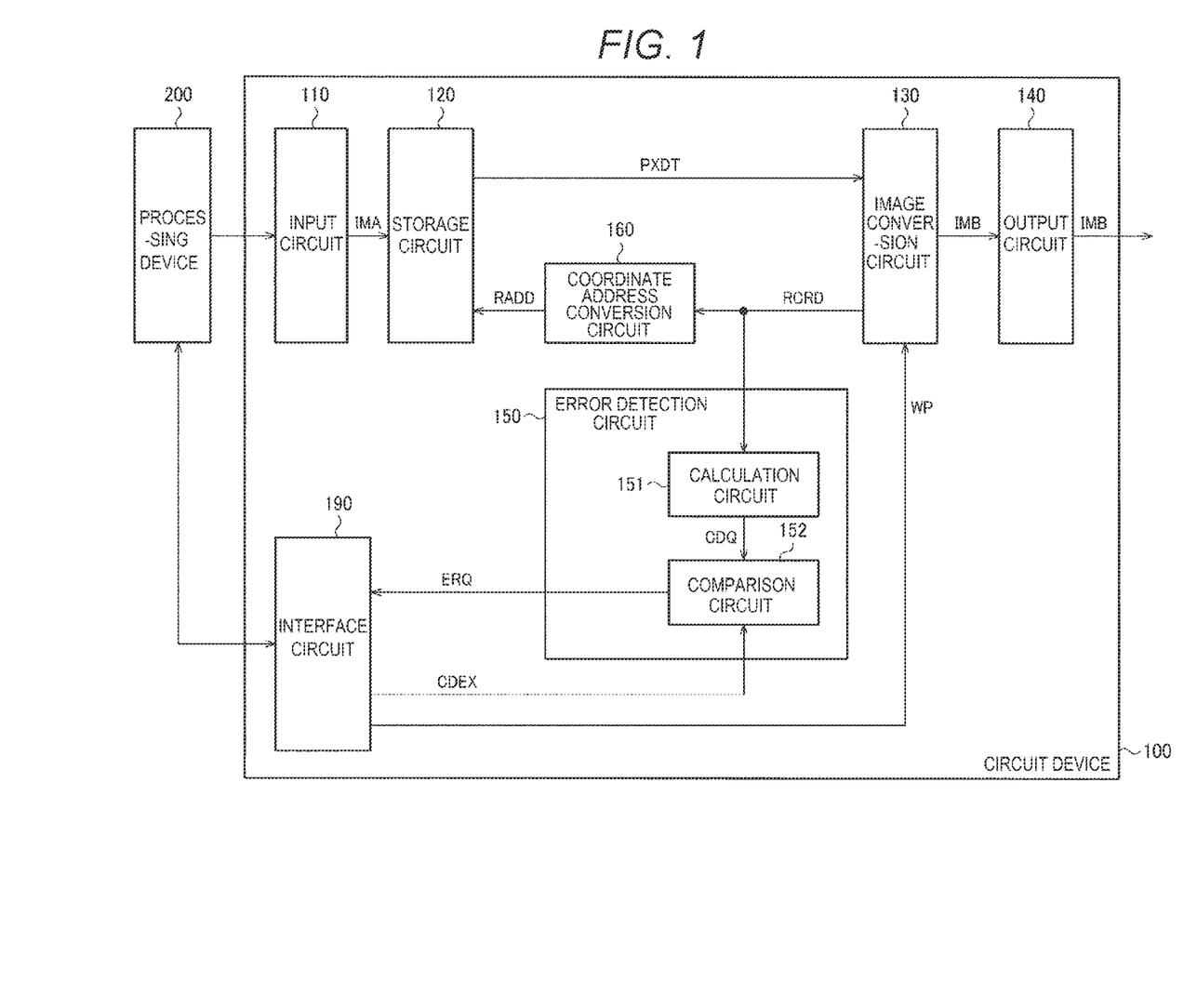
FIG. 1 is a first configuration example of a circuit device.

FIG. 1 is a first configuration example of a circuit device 100 according to the present embodiment. The circuit device 100 is a circuit device that performs distortion correction of an image, scaling of an image, or both of the distortion correction and the scaling, and is provided at, for example, a previous stage of a display controller in a display device. Alternatively, the circuit device 100 may be a display controller having functions of distortion correction of an image, scaling of an image, or both of the distortion correction and the scaling.

The circuit device 100 may be used in various display devices, and is used for a head-up display as an example. The head-up display projects an image on a transparent screen to display a virtual image in a superimposed manner on a field of view of a user viewing the screen. At this time, a display image is distorted due to distortion of a screen or an optical system such as a projection optical system, but a display image without distortion is displayed by correcting the image with distortion opposite to the distortion. This correction is the distortion correction.

The scaling is processing of enlarging or reducing all or a part of an image. Specifically, the scaling is processing of increasing or decreasing the number of horizontal pixels of an image, the number of vertical pixels of an image, or both of the number of horizontal pixels of an image and the number of vertical pixels of an image.

The circuit device 100 includes an input circuit 110, a storage circuit 120, an image conversion circuit 130, an output circuit 140, an error detection circuit 150, a coordinate address conversion circuit 160, and an interface circuit 190. The circuit device 100 is, for example, an integrated circuit device in which a plurality of circuit elements are integrated on a semiconductor substrate.

The input circuit 110 receives first image data IMA from a processing device 200. The input circuit 110 may be a receiving circuit of various communication interfaces, and is, for example, a receiving circuit of an LVDS, a DVI, a display port, a GMSL, or a GVIF. The LVDS is an abbreviation for low voltage differential signaling, the DVI is an abbreviation for digital visual interface, the GMSL is an abbreviation for gigabit multimedia serial link, and the GVIF is an abbreviation for gigabit video interface.

The storage circuit 120 stores the first image data IMA received by the input circuit 110. The storage circuit 120 is a line buffer that stores image data of a predetermined number of lines or a frame memory that stores image data of one frame. The storage circuit 120 is, for example, a line latch circuit or a semiconductor memory such as an SRAM or a DRAM.

The image conversion circuit 130 executes an image conversion by a coordinate conversion on the first image data IMA and outputs second image data IMB after the image conversion. The image conversion by the coordinate conversion is an image conversion for generating the second image data IMB by moving pixel data of the first image data IMA to a pixel position on the second image data IMB indicated by the coordinate conversion. Specifically, the image conversion circuit 130 generates the second image data IMB by executing the distortion correction or the scaling on the first image data IMA. The image conversion circuit 130 may execute both the distortion correction and the scaling. Meanings of the distortion correction and the scaling are as described above.

When the image conversion is the distortion correction, the image conversion circuit 130 corresponds to a reverse warp engine. Reverse warp is warp processing of moving the pixel position on the second image data IMB to a reference coordinate corresponding thereto and obtaining pixel data of the second image data IMB based on the pixel data of the first image data IMA at the reference coordinate. At this time, the image conversion circuit 130 outputs a reference coordinate RCRD on the first image data IMA corresponding to the pixel position on the second image data IMB based on a correction parameter WP, which is a warp parameter.

When the image conversion is the scaling, the image conversion circuit 130 outputs the reference coordinate RCRD on the first image data IMA corresponding to the pixel position on the second image data IMB based on the correction parameter WP, which is a scaling parameter. The scaling is, example, a parameter parameter for indicating an enlargement ratio or a reduction ratio of an image. In addition, the scaling parameter may include a coordinate of a scaling center. When a part of an image is scaled, the scaling parameter may include a parameter designating a scaling target region.

The coordinate address conversion circuit 160 converts the reference coordinate RCRD into a read address RADD of the storage circuit 120. The read address RADD is an address in which pixel data corresponding to the reference coordinate RCRD is stored. When the correction parameters WP are the same and no abnormality is in the image conversion circuit 130, the same read address RADD is output for the same reference coordinate RCRD for each frame. For example, when the storage circuit 120 is operated as a rotation line buffer, physical addresses at which initial pixel data of a frame is stored are different for each frame. In this case, the coordinate address conversion circuit 160 may output the same logical address for each frame, and the storage circuit 120 may convert the logical address into an appropriate physical address for each frame. When the physical addresses in which the initial pixel data of a frame is stored are the same for each frame, the read address RADD may be a physical address.

The storage circuit 120 reads pixel data PXDT from the read address RADD and outputs the pixel data PXDT to the image conversion circuit 130. The image conversion circuit 130 constitutes the second image data IMB from the pixel data PXDT. As will be described later, a plurality of pieces of pixel data may be read for one reference coordinate RCRD, and the image conversion circuit 130 may obtain the pixel data of the second image data IMB by executing an interpolation operation on the plurality of pieces of pixel data.

The output circuit 140 transmits the second image data IMB to a display controller or the like in a subsequent stage. The output circuit 140 may be a transmission circuit of various communication interfaces, and is, for example, a transmission circuit of an LVDS, a DVI, a display port, a GMSL, or a GVIF.

The error detection circuit 150 detects an abnormality in the image conversion circuit 130 by detecting an error in the reference coordinate RCRD. The error detection circuit 150 includes a calculation circuit 151 that calculates an error code value CDQ based on the reference coordinate RCRD and a comparison circuit 152 that compares the error code value CDQ with an expected value CDEX of the error code value.

In each frame, the calculation circuit 151 calculates one error code value CDQ based on the reference coordinate RCRD of the one frame. The error code value CDQ is, for example, a CRC code. The CRC is an abbreviation for cyclic redundancy check. Alternatively, the error code value CDQ may be a checksum, a hamming code, or an ECC code. The ECC is an abbreviation for error correcting code.

The comparison circuit 152 outputs an error detection signal ERQ indicating an error when the error code value CDQ and the expected value CDEX do not coincide with each other, and outputs an error detection signal ERQ indicating a non-error when the error code value CDQ and the expected value CDEX coincide with each other. The expected value CDEX is associated with the correction parameter WP, and when the correction parameter WP is changed, the expected value CDEX is also accordingly changed.

The interface circuit 190 transmits and receives setting information, control information, and the like to and from the processing device 200. The interface circuit 190 is, for example, a serial peripheral interface (SPI) type or I2C type serial communication interface. The processing device 200 stores in advance the correction parameter WP and the expected value CDEX calculated in advance into a non-volatile memory or the like, and transmits the correction parameter WP and the expected value CDEX to the interface circuit 190. The interface circuit 190 receives the correction parameter WP and the expected value CDEX of the error code value from the processing device 200, outputs the correction parameter WP to the image conversion circuit 130, and outputs the expected value CDEX to the comparison circuit 152. In addition, the interface circuit 190 outputs the error detection signal ERQ from the comparison circuit 152 to the processing device 200.

When receiving the error detection signal ERQ indicating that an error is detected, the processing device 200 executes processing for coping with the error. For example, when receiving the error detection signal ERQ indicating that an error is detected, the processing device 200 stops transmission of image data to the circuit device 100 or resets the circuit device 100.

The image conversion circuit 130, the coordinate address conversion circuit 160, and the error detection circuit 150 are implemented by logic circuits. These circuits may be integrally implemented by an automatically placed and routed gate array or the like.

Figure 2:
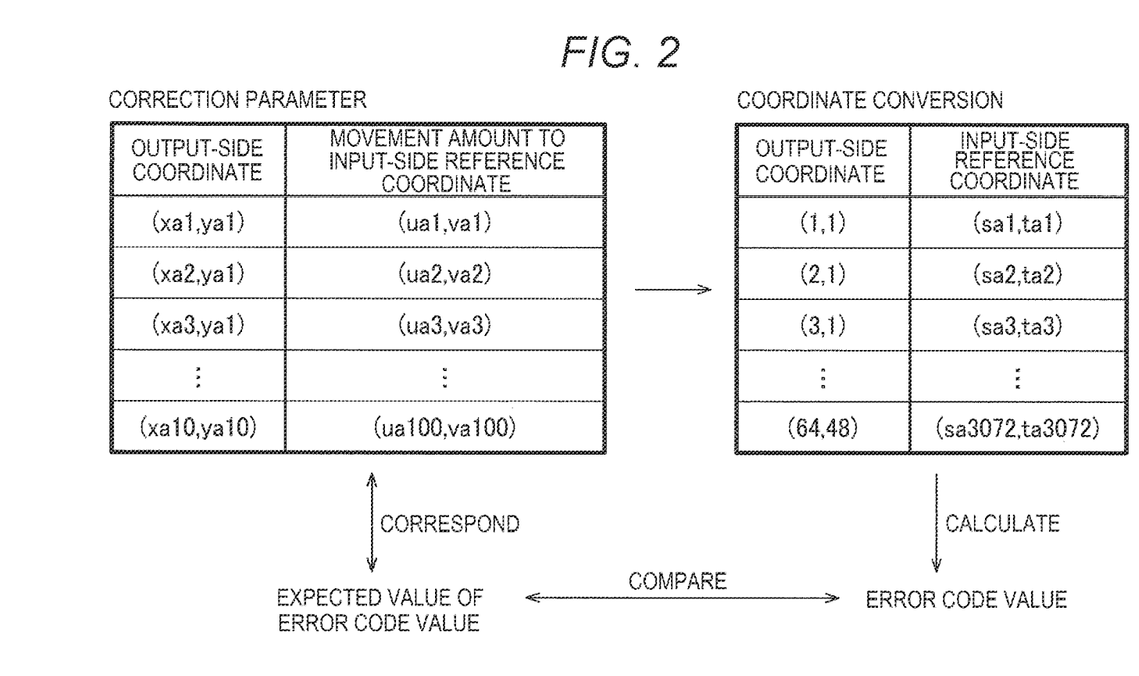
FIG. 2 is a diagram illustrating error detection according to the first configuration example.

FIG. 2 is a diagram illustrating error detection according to the first configuration example. Here, an example will be described in which the image conversion is the distortion correction and a lookup table is used as the correction parameter WP. The number of pixels of the second image data IMB is 64×48. The distortion correction may be executed using a polynomial indicating relation between a coordinate on the first image data IMA and a coordinate on the second image data IMB, and in this case, the correction parameter WP is a coefficient of the polynomial.

As illustrated in FIG. 2, the correction parameter WP is a lookup table in which an output-side coordinate and a movement amount from the output-side coordinate to an input-side reference coordinate are associated with each other. The output-side coordinate means a coordinate on the second image data IMB, and the input-side reference coordinate means a coordinate on the first image data IMA. xa1, xa2, . . . , and xa10 are coordinates in a horizontal scanning direction on the output side, and ya1, ya2, . . . and ya10 are coordinates in a vertical scanning direction on the output side. ua1, ua2, . . . , and ua10 are movement amounts of the coordinates in the horizontal scanning direction, and va1, va2, . . . , and va10 are movement amounts of the coordinates in the vertical scanning direction. For example, an input-side reference coordinate corresponding to (xa1, ya1) on the output side is (xa1+ua1, ya1+va1).

The image conversion circuit 130 uses the correction parameter WP described above to obtain reference coordinates (sa1, ta1), (sa2, ta2), (sa3, ta3), . . . , and (sa3072, ta3072) on the first image data IMA corresponding to coordinates (1, 1), (2, 1), (3, 1), . . . , and (64, 48) of the pixels in the second image data IMB. The image conversion circuit 130 obtains a reference coordinate for a pixel position that is not present in the lookup table of the correction parameter WP by, for example, the interpolation operation.

The calculation circuit 151 obtains the error code value CDQ based on the reference coordinates (sa1, ta1), (sa2, ta2), (sa3, ta3), . . . , and (sa3072, ta3072) of one frame output by the image conversion circuit 130. When the reference coordinates are normally obtained, since the same reference coordinate is to be output for the same correction parameter WP, one expected value CDEX corresponds to one correction parameter WP. The comparison circuit 152 checks whether the image conversion circuit 130 outputs a correct reference coordinate by comparing the error code value CDQ obtained by the calculation circuit 151 with the expected value CDEX.

Figure 3:
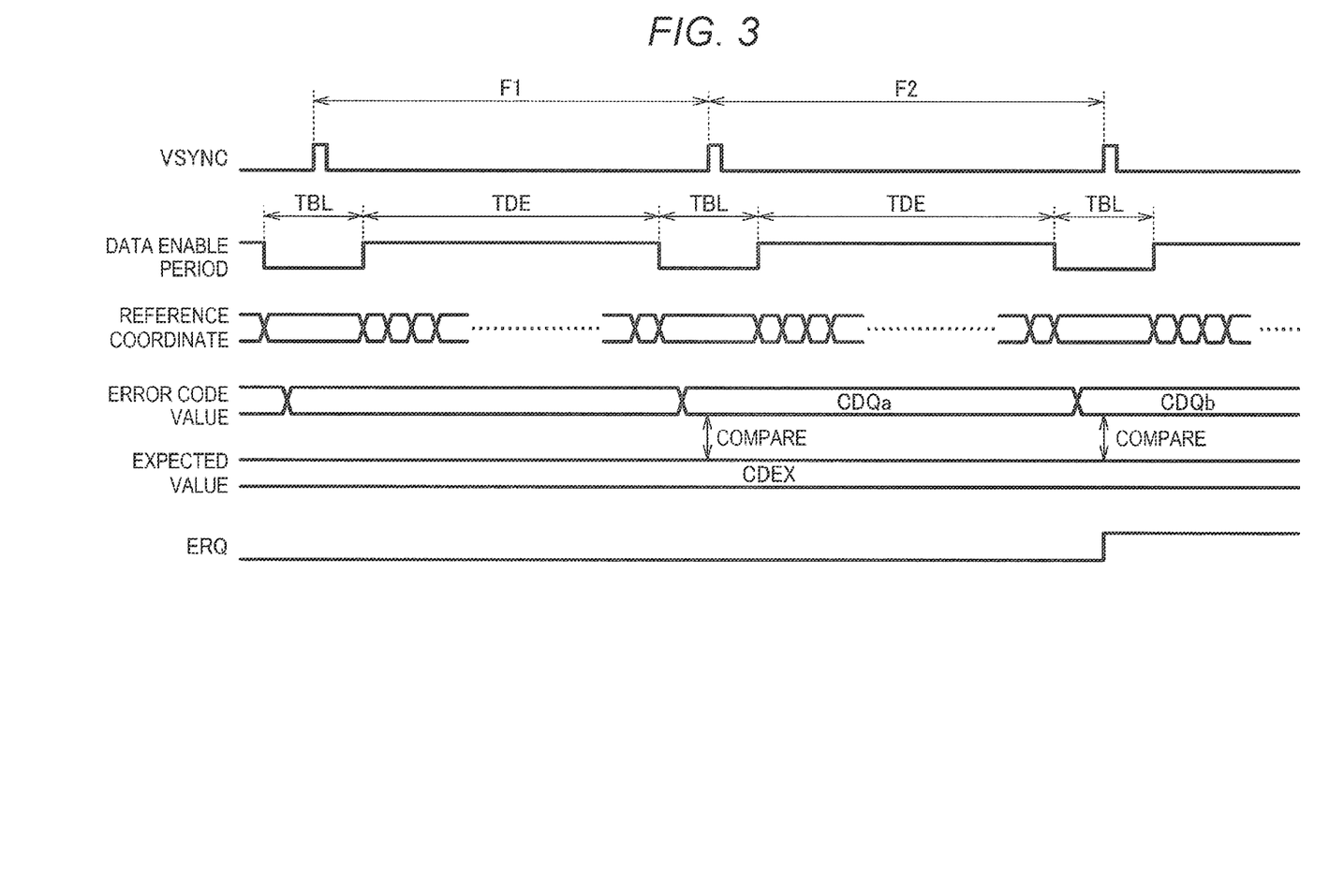
FIG. 3 is a timing chart of the error detection according to the first configuration example.

FIG. 3 is a timing chart of the error detection according to the first configuration example. It should be noted that FIG. 3 illustrates an outline of an operation timing and an operation timing of the circuit device 100 is not limited to that in FIG. 3. For example, in FIG. 3, a data enable period TDE and an output period of the reference coordinate RCRD coincide with each other, while relation between these periods may be appropriately set according to read and write control of the storage circuit 120.

As illustrated in FIG. 3, it is assumed that a first frame F1 and a following second frame F2 are defined by a vertical synchronization signal VSYNC. Each frame includes the data enable period TDE defined by a data enable signal. A vertical blanking period TBL is set between the data enable period TDE and the next data enable period TDE.

In the data enable period TDE of the first frame F1, the input circuit 110 receives the first image data IMA, the first image data IMA is written in the storage circuit 120, and the image conversion circuit 130 sequentially outputs the reference coordinates RCRD. After the reference coordinate RCRD for one frame is output, the calculation circuit 151 outputs an error code value CDQa calculated based on the reference coordinate RCRD for one frame. The calculation circuit 151 updates the error code value in, for example, vertical blanking period TBL. The comparison circuit 152 compares the error code value CDQa with the expected value CDEX, and outputs the error detection signal ERQ. FIG. 3 illustrates an example in which the error code value CDQa and the expected value CDEX coincide with each other and a low-level error detection signal ERQ is output. Here, it is assumed that a high-level error detection signal ERQ indicates an error.

Similarly, in the second frame F2, the calculation circuit 151 outputs an error code value CDQb calculated based on the reference coordinate RCRD for one frame. The comparison circuit 152 compares the error code value CDQb with the expected value CDEX, and outputs the error detection signal ERQ. FIG. 3 illustrates an example in which the error code value CDQb and the expected value CDEX do not coincide with each other, and the high-level error detection signal ERQ is output.

In the embodiment described above, the circuit device 100 includes the storage circuit 120, the image conversion circuit 130, and the error detection circuit 150. The storage circuit 120 stores the received first image data IMA. The image conversion circuit 130 executes the image conversion by the coordinate conversion on the first image data IMA by outputting the reference coordinate RCRD indicating the pixel position on the first image data IMA and outputting the second image data IMB based on the pixel data PXDT that is read from the storage circuit 120 based on the output reference coordinate RCRD. The error detection circuit 150 executes the error detection on the reference coordinate RCRD output by the image conversion circuit 130.

According to the present embodiment, the error detection is executed on the reference coordinate RCRD output by the image conversion circuit 130, so that whether the reference coordinate RCRD output by the image conversion circuit 130 is correct is checked with high accuracy. Accordingly, as compared to JP-A-2019-149760, it is possible to detect an abnormality in the image conversion circuit 130 with high accuracy.

It should be noted that the error detection on a reference coordinate may be error detection of detecting whether the reference coordinate is correct. That is, in the first configuration example, the error detection circuit 150 detects an error in the reference coordinate RCRD, but the present disclosure is not limited thereto. The error detection circuit 150 may execute the error detection on the reference coordinate RCRD by detecting an error in data or the like generated based on the reference coordinate RCRD. For example, in a third configuration example which will be described later, the error detection circuit 150 detects an error in the read address RADD output based on the reference coordinate RCRD. In this case, whether the reference coordinate RCRD is correct is checked by checking whether the read address RADD is correct.

In the present embodiment, the error detection circuit 150 executes the error detection by comparing the error code value CDQ obtained based on the reference coordinate RCRD output by the image conversion circuit 130 with the expected value CDEX of the error code value.

According to the present embodiment, whether the reference coordinate RCRD output by the image conversion circuit 130 is correct is checked by comparing the error code value CDQ obtained based on the reference coordinate RCRD with the expected value CDEX of the error code value CDQ. Since the reference coordinate RCRD is a real value, it can be expected that accuracy of the error detection is higher when the error detection is executed on the reference coordinate RCRD, as compared with a case in which the error detection is executed after the conversion to the read address RADD which is an integer value.

In addition, in the present embodiment, the coordinate conversion is a coordinate conversion in the distortion correction of an image or the scaling of an image.

The distortion correction and the scaling are image conversions accompanied by the coordinate conversion. In the coordinate conversion, it is possible to detect an abnormality in the image conversion circuit 130 by detecting an error for the reference coordinate RCRD output by the image conversion circuit 130.

In the present embodiment, the error detection circuit 150 executes the error detection by the CRC.

According to the present embodiment, the CRC code can be obtained by the error detection circuit 150 sequentially executing an encoding operation on the reference coordinates RCRD sequentially output by the image conversion circuit 130. In addition, it is possible to execute the error detection with relatively higher accuracy using the CRC. For example, when a 16-bit CRC is used, error detection accuracy is 1/65536.

The present embodiment can be implemented as an error detection method as follows. Specifically, the error detection method includes storing the first image data IMA in the storage circuit 120. The error detection method includes executing the image conversion by the coordinate conversion on the first image data IMA and outputting the second image data IMB after the image conversion. The error detection method includes, in the image conversion, outputting the reference coordinate RCRD indicating the pixel position on the first image data IMA and outputting the second image data IMB based on the pixel data PXDT that is read from the storage circuit 120 based on the output reference coordinate RCRD. The error detection method includes executing the error detection on the output reference coordinate RCRD.

2. Second Configuration Example

A second configuration example is an example in which a coordinate conversion is executed by switching a plurality of correction parameters. The configuration of the circuit device 100 is the same as that in FIG. 1.

Figure 4:
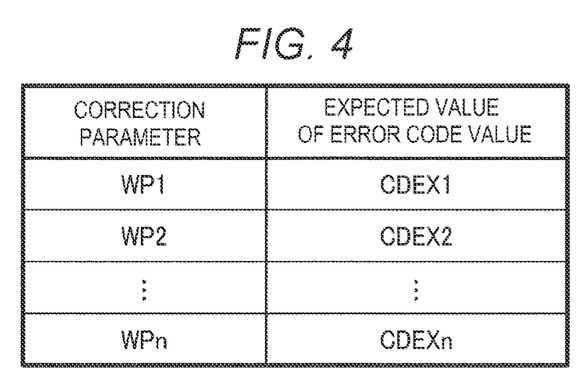
FIG. 4 is a diagram illustrating a correspondence between a correction parameter and an expected value of an error code value.

FIG. 4 is a diagram illustrating a correspondence between a correction parameter and an expected value of an error code value. Correction parameters WP1 to WPn are correction parameters different from one another. That is, coordinate conversions using the correction parameters WP1 to WPn are coordinate conversions different from one another. n is an integer of 2 or more.

When the image conversion circuit 130 outputs the reference coordinate RCRD using the correction parameter WP1, the error detection circuit 150 executes error detection using an expected value CDEX1 of an error code value corresponding to the correction parameter WP1. Similarly, when the image conversion circuit 130 outputs the reference coordinates RCRD using the correction parameters WP2 to WPn, the error detection circuit 150 executes error detection using expected values CDEX2 to CDEXn of error code values corresponding to the correction parameters WP2 to WPn.

The interface circuit 190 receives the correction parameters WP1 to WPn and the expected values CDEX1 to CDEXn from the processing device 200. For example, each time the correction parameter is switched, the interface circuit 190 may receive the correction parameter and the expected value from the processing device 200. Alternatively, the circuit device 100 may include a register or a memory (not illustrated), and the interface circuit 190 may receive the correction parameters WP1 to WPn and the expected values CDEX1 to CDEXn at once from the processing device 200 and store the correction parameters WP1 to WPn and the expected values CDEX1 to CDEXn into the register or the memory.

It should be noted that the interface circuit 190 does not necessarily need to receive all the correction parameters WP1 to WPn. For example, the interface circuit 190 may receive the correction parameter WP1 alone, and the image conversion circuit 130 may generate the correction parameters WP2 to WPn based on the correction parameter WP1. In this case, the error detection circuit 150 executes the error detection using an expected value corresponding to the correction parameter generated by the image conversion circuit 130 among the expected values CDEX1 to CDEXn received by the interface circuit 190.

Figure 5:
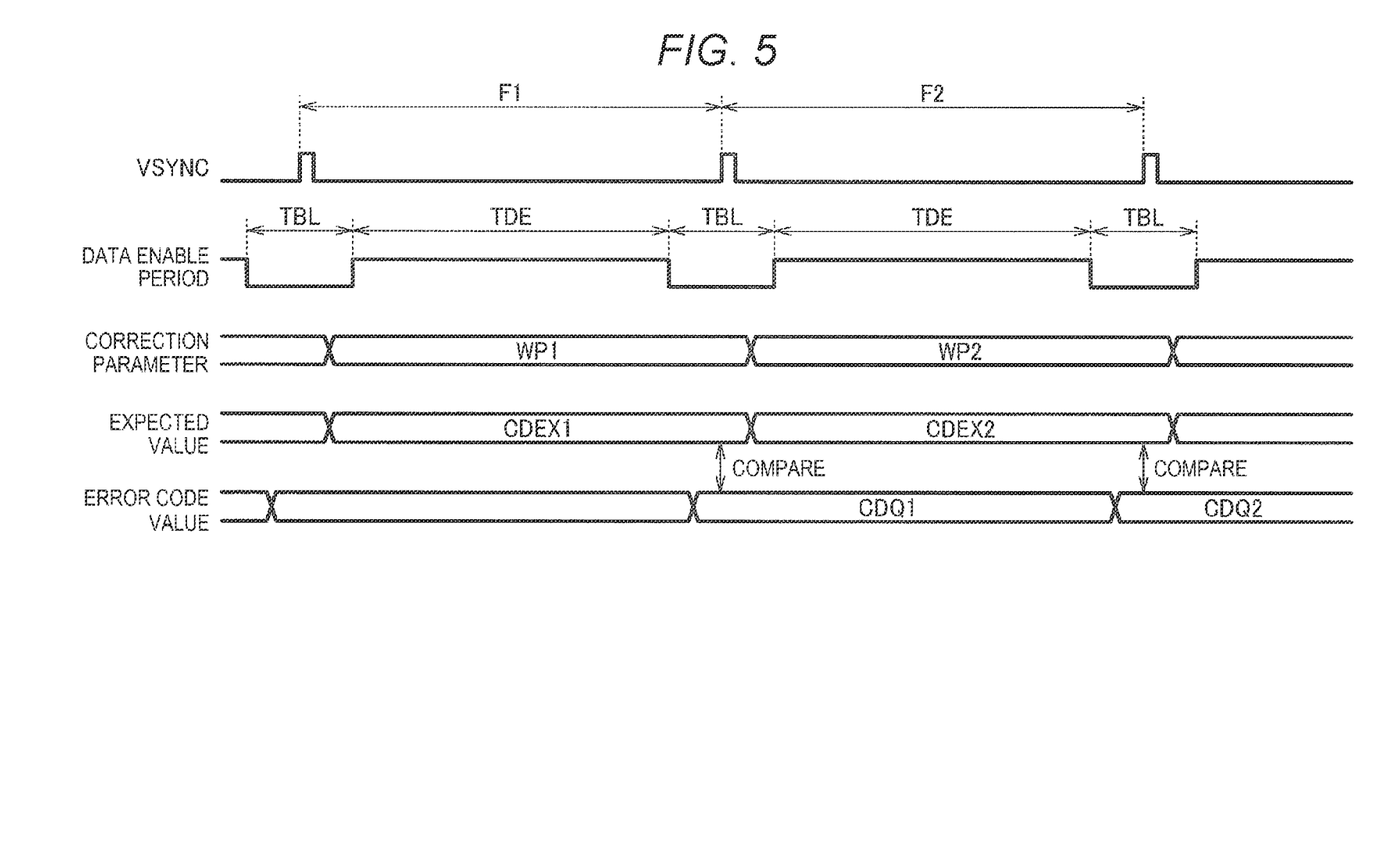
FIG. 5 is a timing chart of error detection according to a second configuration example.

FIG. 5 is a timing chart of the error detection according to the second configuration example. It should be noted that FIG. 5 illustrates an outline of an operation timing and an operation timing of the circuit device 100 is not limited to that in FIG. 5.

The image conversion circuit 130 sets a correction parameter as WP1 in the vertical blanking period TBL before the data enable period TDE of the first frame F1 starts. At the same timing, the error detection circuit 150 sets an expected value of an error code value to CDEX1. However, an update timing of the expected value is not limited thereto, and the expected value may be updated before comparison is executed. The image conversion circuit 130 outputs the reference coordinate RCRD based on the correction parameter WP1, and the calculation circuit 151 obtains an error code value CDQ1 based on the reference coordinate RCRD. The comparison circuit 152 compares the error code value CDQ1 with the expected value CDEX1.

Similarly, the image conversion circuit 130 sets a correction parameter as WP2 in the vertical blanking period TBL before the data enable period TDE of the second frame F2 starts. At the same timing, the error detection circuit 150 sets an expected value of an error code value as CDEX2. The image conversion circuit 130 outputs the reference coordinate RCRD based on the correction parameter WP2, and the calculation circuit 151 obtains an error code value CDQ2 based on the reference coordinate RCRD. The comparison circuit 152 compares the error code value CDQ2 with the expected value CDEX2.

In the embodiment described above, the circuit device 100 includes the interface circuit 190 that acquires the expected value CDEX.

According to the present embodiment, the expected value CDEX corresponding to the correction parameter WP can be input to the circuit device 100 from an outside of the circuit device 100. The correction parameter WP differs depending on what type of coordinate conversion is executed, and the expected value CDEX according to the correction parameter WP can be set from the outside of the circuit device 100.

In the present embodiment, the interface circuit 190 acquires the expected value CDEX that is associated with the correction parameter WP representing the coordinate conversion. The image conversion circuit 130 outputs the reference coordinate RCRD based on the correction parameter WP. The error detection circuit 150 executes the error detection using the expected value CDEX associated with the correction parameter WP.

According to the present embodiment, the error detection circuit 150 calculates the error code value CDQ based on the reference coordinate RCRD output based on the correction parameter WP, and compares the error code value CDQ with the expected value CDEX associated with the correction parameter WP. Accordingly, whether the reference coordinate RCRD output based on the correction parameter WP is correct can be checked.

3. Third Configuration Example

Figure 6:
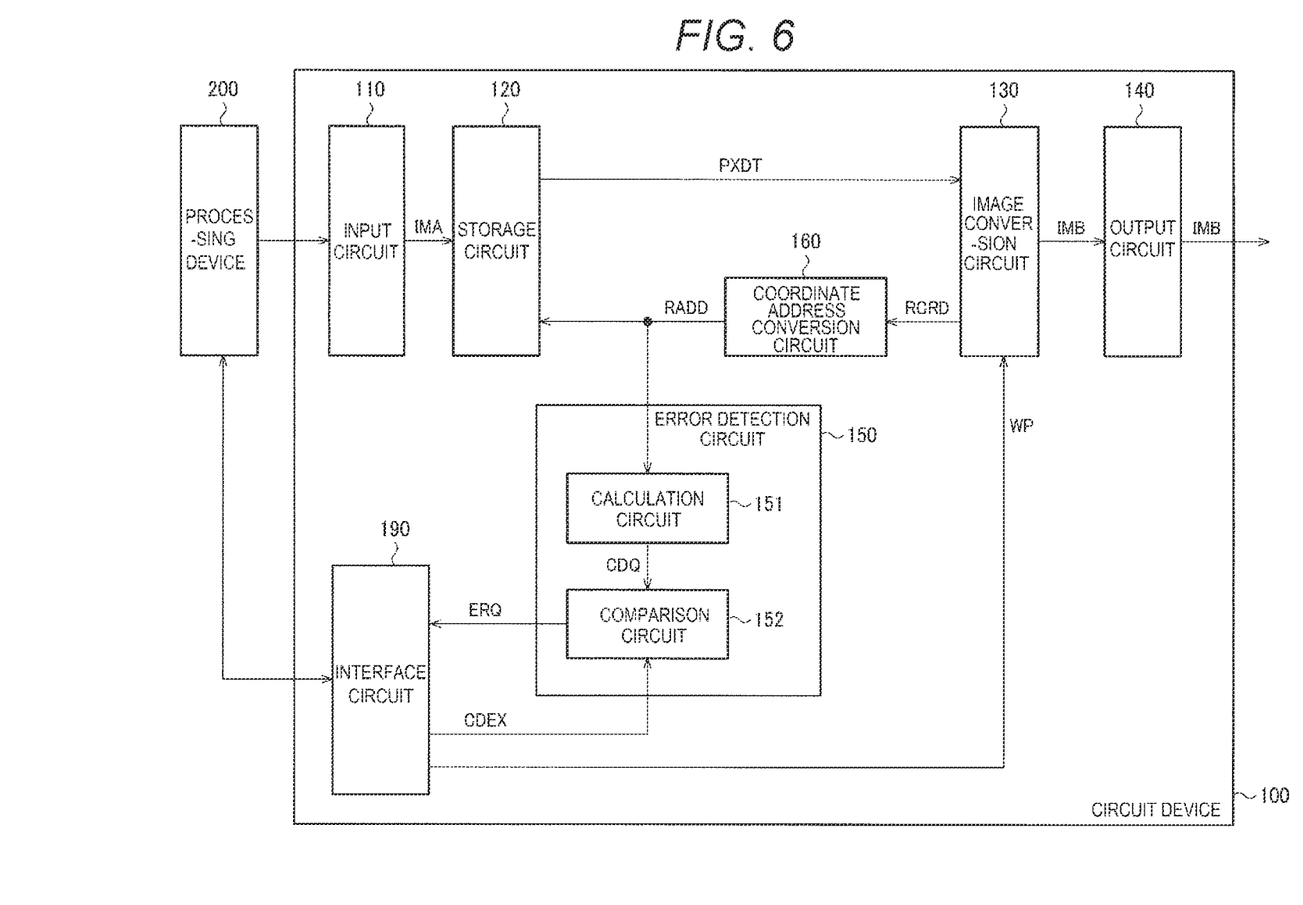
FIG. 6 is a third configuration example of a circuit device.

FIG. 6 is a third configuration example of the circuit device 100 according to the present embodiment. Description of the same components as those described above will be appropriately omitted.

The error detection circuit 150 detects abnormalities in the image conversion circuit 130 and the coordinate address conversion circuit 160 by detecting an error in the read address RADD output by the coordinate address conversion circuit 160. The error detection circuit 150 includes the calculation circuit 151 that calculates the error code value CDQ based on the read address RADD and the comparison circuit 152 that compares the error code value CDQ with the expected value CDEX of the error code value.

Figure 7:
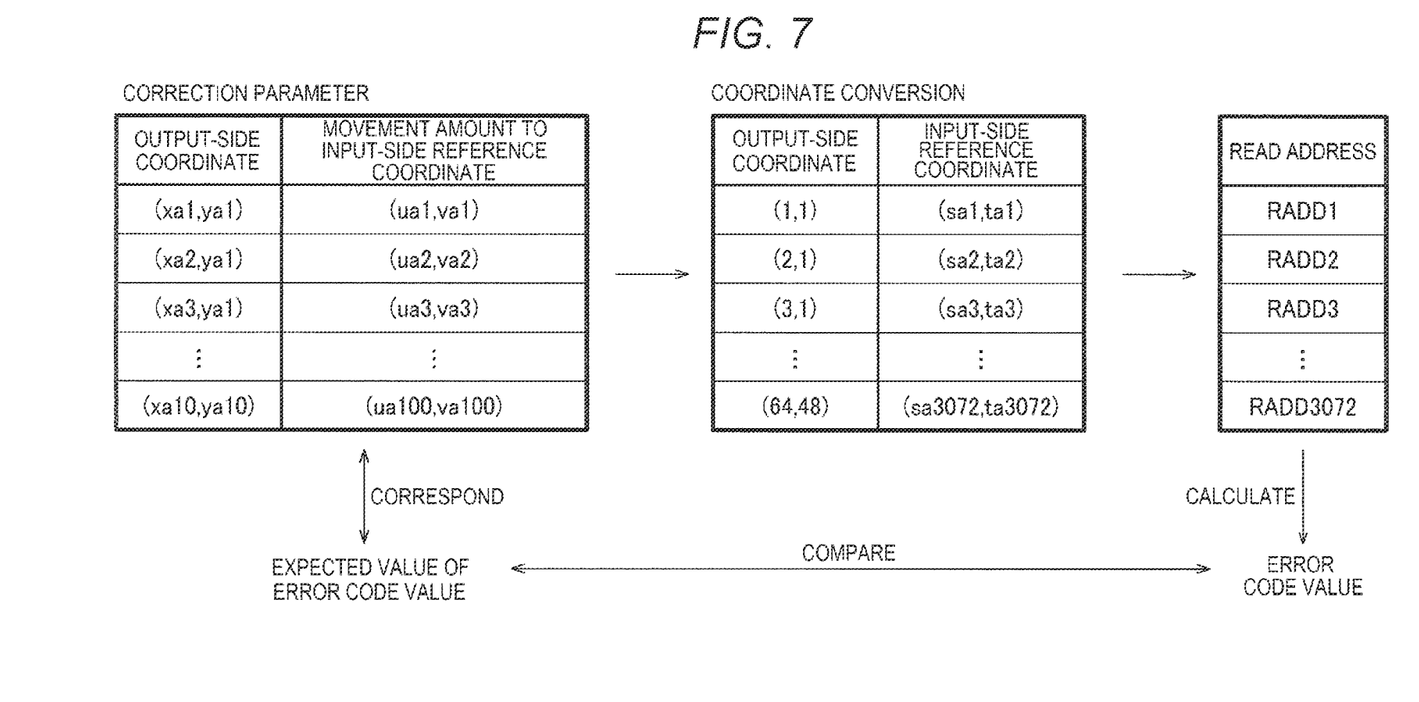
FIG. 7 is a diagram illustrating error detection according to the third configuration example.

FIG. 7 is a diagram illustrating error detection according to the third configuration example. Similarly to FIG. 2, the image conversion circuit 130 outputs reference coordinates (sa1, ta1), (sa2, ta2), (sa3, ta3), . . . , and (sa3072, ta3072) based on correction parameters. The coordinate address conversion circuit 160 converts the reference coordinate (sa1, ta1) into a read address RADD1. The read address RADD1 is, for example, an address in which pixel data located at a coordinate closest to the reference coordinate (sa1, ta1) in the first image data IMA is stored. Similarly, the coordinate address conversion circuit 160 converts the reference coordinates (sa2, ta2), (sa3, ta3), . . . , and (sa3072, ta3072) into read addresses RADD2, RADD3, . . . , and RADD3072.

The calculation circuit 151 obtains the error code values CDQ based on the read addresses RADD1, RADD2, RADD3, . . . , and RADD3072 of one frame output by the coordinate address conversion circuit 160. When the reference coordinates and the read addresses are normally obtained, since the same read address is to be output for the same correction parameter WP, one expected value CDEX corresponds to one correction parameter WP. The comparison circuit 152 checks whether the coordinate address conversion circuit 160 outputs a correct read address by comparing the error code value CDQ obtained by the calculation circuit 151 with the expected value CDEX.

In the embodiment described above, the circuit device 100 includes the coordinate address s conversion circuit 160. The coordinate address conversion circuit 160 converts the reference coordinate RCRD output by the image conversion circuit 130 into the read address RADD of the storage circuit 120. The error detection circuit 150 executes the error detection by comparing the error code value CDQ obtained based on the read address RADD output by the coordinate address conversion circuit 160 with the expected value CDEX of the error code value.

According to the present embodiment, whether the reference coordinate RCRD output by the image conversion circuit 130 is correct is checked by comparing the error code value CDQ obtained based on the read address RADD with the expected value CDEX of the error code value CDQ. The error detection is executed in a subsequent stage of the coordinate address conversion circuit 160, and thus not only the abnormality in the image conversion circuit 130 but also the abnormality in the coordinate address conversion circuit 160 can be detected as compared with a case in which the error detection is executed on the reference coordinate RCRD.

4. Fourth Configuration Example

A fourth configuration example is an example of executing an interpolation operation in an image conversion. The configuration of the circuit device 100 is the same as that in FIG. 6.

Figure 8:
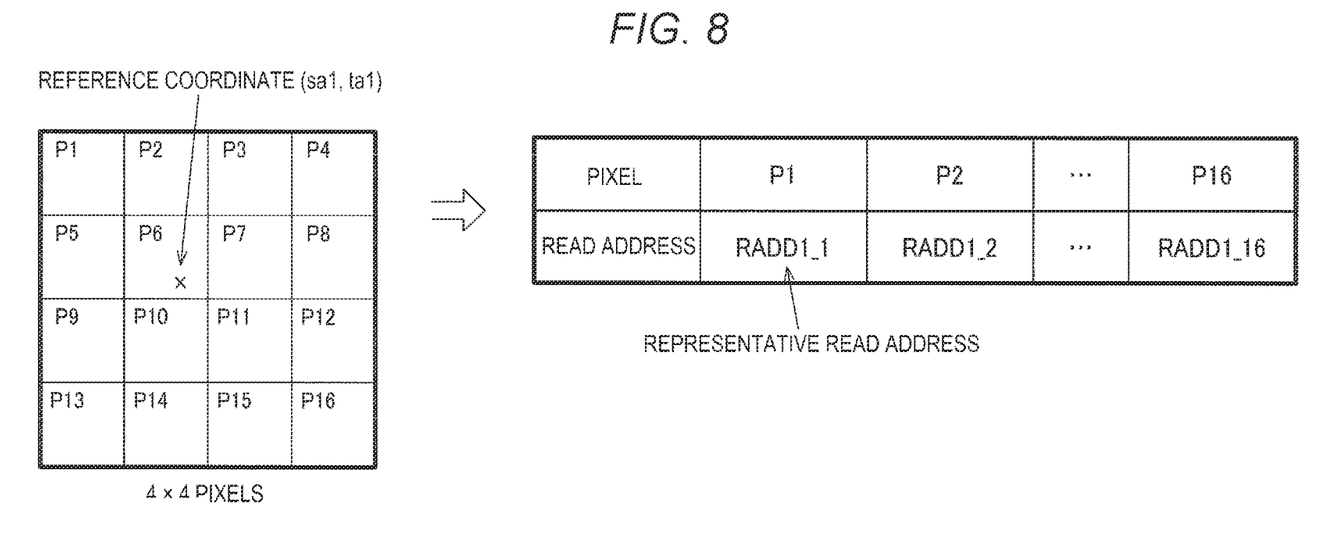
FIG. 8 is a diagram illustrating error detection according to a fourth configuration example.

FIG. 8 is a diagram illustrating error detection according to the fourth configuration example. Basic operations are the same as those in FIG. 7, while in the fourth configuration example, the coordinate address conversion circuit 160 outputs a plurality of read addresses from one reference coordinate. FIG. 8 illustrates an example in which a reference coordinate (sa1, ta1) is converted into 4×4 read addresses.

P1, P2, . . . and P16 are 4×4 pixels present around the reference coordinate (sa1, ta1) in the first image data IMA. The coordinate address conversion circuit 160 outputs read addresses RADD1_1, RADD1_2, . . . , and RADD1_16 for reading pixel data of these pixels P1, P2, . . . , and P16 from the storage circuit 120. The image conversion circuit 130 obtains pixel data of an output-side coordinate (xa1, ya1) by executing the interpolation operation based on the pixel data of the pixels P1, P2, . . . and P16 read from the storage circuit 120.

Similarly, the coordinate address conversion circuit 160 outputs 4×4 read addresses for each of reference coordinates (sa2, ta2), (sa3, ta3), . . . , and (sa3072, ta3072). The image conversion circuit 130 obtains pixel data of output-side coordinates (sa2, ta2), (sa3, ta3), . . . , and (sa3072, ta3072) by the interpolation operation.

The calculation circuit 151 obtains the error code value CDQ from all read addresses output from the coordinate address conversion circuit 160 in one frame. Alternatively, the calculation circuit 151 may obtain the error code value CDQ based on a representative read address of one frame. FIG. 8 illustrates an example in which RADD1_1 among the read addresses RADD1_1 to RADD1_16 is used as the representative read address.

In the embodiment described above, in the image conversion, the coordinate address conversion circuit 160 outputs a plurality of read addresses RADD1_1 to RADD1_16 corresponding to a plurality of pieces of pixel data used in the interpolation operation. The error detection circuit 150 executes the error detection by comparing the error code values CDQ obtained based on the plurality of read addresses RADD1_1 to RADD1_16 with the expected values CDEX.

According to the present embodiment, errors in the plurality of read addresses RADD1_1 to RADD1_16 corresponding to the plurality of pieces of pixel data used in the interpolation operation can be collectively detected by comparing the error code values CDQ with the expected values CDEX.

In the present embodiment, the error detection circuit 150 may execute the error detection by comparing the error code value CDQ obtained based on the representative read address among the plurality of read addresses RADD1_1 to RADD1_16 with the expected value CDEX.

According to the present embodiment, the error code value CDQ is calculated based on the representative read address alone, and thus a calculation load of the error code value CDQ is reduced. It should be noted that error detection on read addresses other than the representative read address may be separately executed. Specifically, relative positional relation among the plurality of pieces of pixel data used in the interpolation operation is known, and thus the read addresses of the plurality of pieces of pixel data can be calculated based on the representative read address. These read addresses are used as expected values and are compared with the read address output by the image conversion circuit 130, so that the error detection also can be executed on the read addresses other than the representative read address.

5. Fifth Configuration Example

Figure 9:
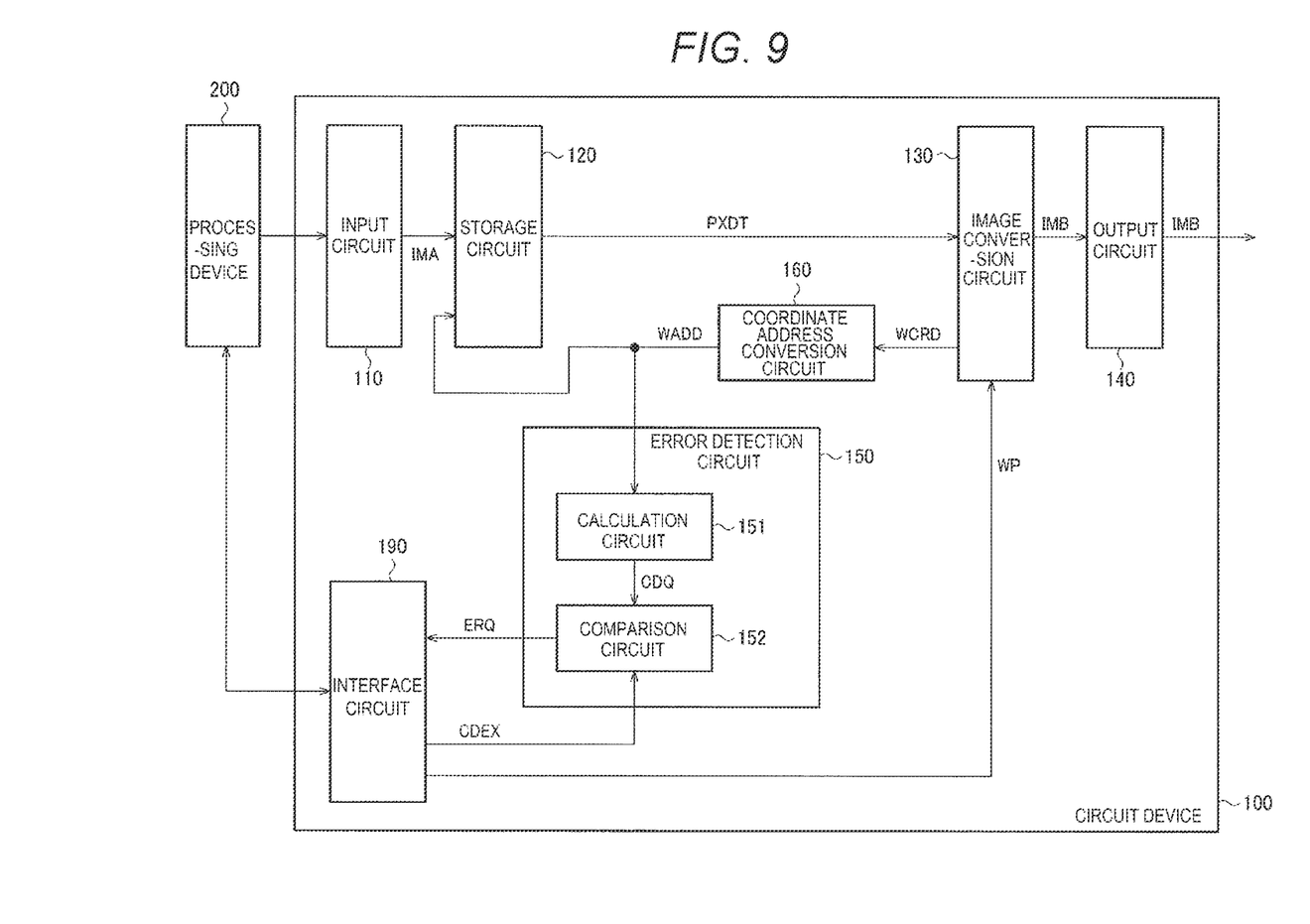
FIG. 9 is a fifth configuration example of a circuit device.

FIG. 9 is a fifth configuration example of the circuit device 100 according to the present embodiment. The fifth configuration example is an example of executing distortion correction by forward warp. Description of the same components as those described above will be appropriately omitted.

The forward warp is warping processing for moving each piece of pixel data of the first image data IMA to a corresponding movement destination coordinate to obtain pixel data of the second image data IMB in the movement destination coordinate. Specifically, the image conversion circuit 130 outputs a movement destination coordinate WCRD on the second image data IMB corresponding to each piece of pixel data on the first image data IMA based on the correction parameter WP which is a warp parameter. The coordinate address conversion circuit 160 converts the movement destination coordinate WCRD into a write address WADD of the storage circuit 120. The write address WADD is an address corresponding to the movement destination coordinate WCRD. The storage circuit 120 writes the pixel data of the first image data IMA into the write address WADD. The image conversion circuit 130 outputs the second image data IMB by executing an interpolation operation based on the pixel data PXDT read from the storage circuit 120.

Figure 10:
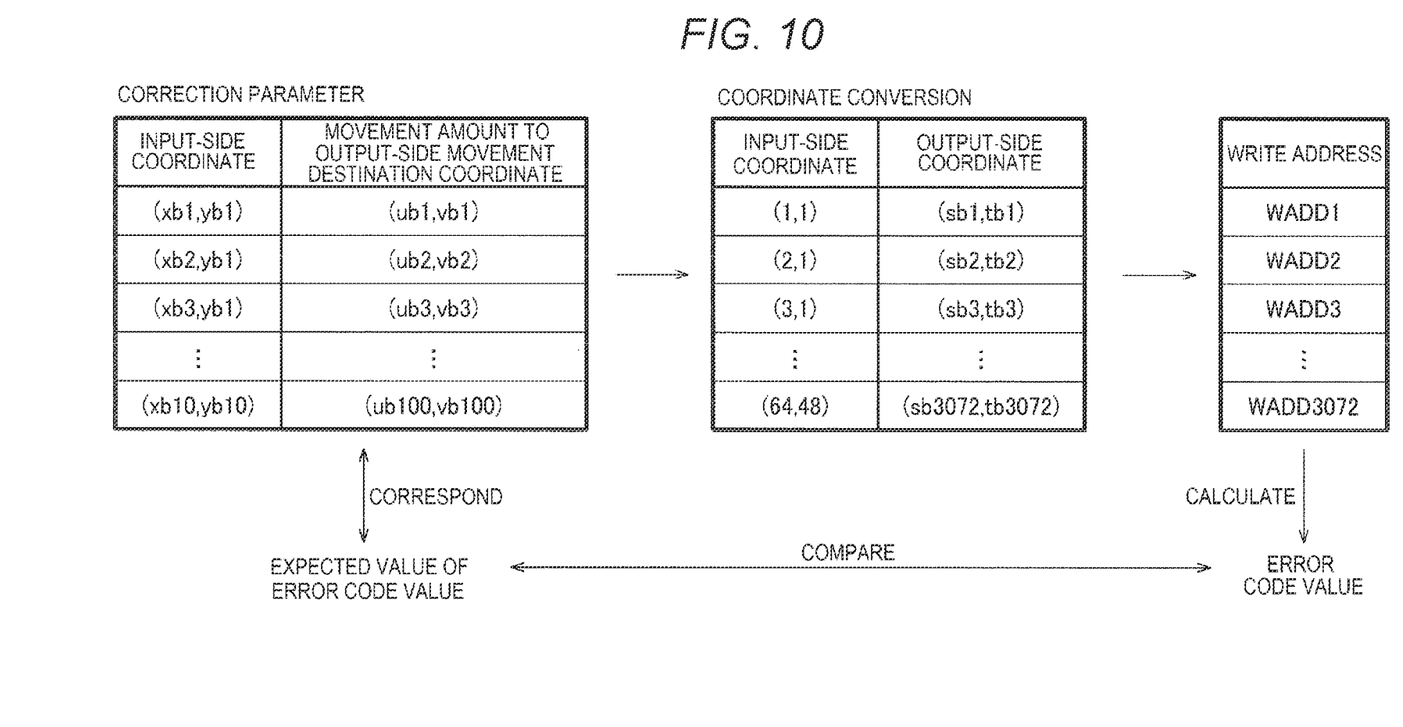
FIG. 10 is a diagram illustrating error detection according to the fifth configuration example.

FIG. 10 is a diagram illustrating error detection according to the fifth configuration example. Here, an example will be described in which a lookup table is used as the correction parameter WP. In addition, here, the number of pixels of the first image data IMA is 64×48. Distortion correction may be executed using a polynomial indicating relation between a coordinate on the first image data IMA and a coordinate on the second image data IMB, and in this case, the correction parameter WP is a coefficient of the polynomial.

The correction parameter WP is a lookup table in which an input-side coordinate and a movement amount from the input-side coordinate to an output-side movement destination coordinate are associated with each other. The input-side coordinate means a coordinate on the first image data IMA, and the output-side movement destination coordinate means a coordinate on the second image data IMB. xb1, xb2, . . . , and xb10 are coordinates in a horizontal scanning direction on the input side, and yb1, yb2, . . . , and yb10 are coordinates in a vertical scanning direction on the input side. ub1, ub2, . . . , and ub10 are movement amounts of the coordinates in the horizontal scanning direction. vb1, vb2, . . . , and vb10 are movement amounts of the coordinates in the vertical scanning direction. For example, an output-side movement destination coordinate corresponding to (xb1, yb1) on the input side is (xb1+ub1, yb1+vb1).

The image conversion circuit 130 uses the correction parameter WP to obtain movement destination coordinates (sb1, tb1), (sb2, tb2), (sb3, tb3), . . . , and (sb3072, tb3072) on the second image data IMB corresponding to coordinates (1, 1), (2, 1), (3, 1), . . . , and (64, 48) of the pixels in the first image data IMA. The image conversion circuit 130 obtains a movement destination coordinate for a pixel position that is not present in the lookup table of the correction parameter WP by, for example, the interpolation operation.

The coordinate address conversion circuit 160 converts the movement destination coordinate (sb1, tb1) into a write address WADD1. The write address WADD1 is, for example, an address in which pixel data located at coordinate closest to the movement destination coordinate (sb1, tb1) in the second image data IMB is stored. Similarly, the coordinate address conversion circuit 160 converts the reference coordinates (sb2, tb2), (sb3, tb3), . . . , and (sb3072, tb3072) into write addresses WADD2, WADD3, . . . , and WADD3072.

The calculation circuit 151 obtains the error code values CDQ from the write addresses WADD1, WADD2, WADD3, . . . , and WADD3072 of one frame output by the coordinate address conversion circuit 160. When the movement destination coordinate and the write address are normally obtained, since the same write address is to be output for the same correction parameter WP, one expected value CDEX corresponds to one correction parameter WP. The comparison circuit 152 checks whether the coordinate address conversion circuit 160 outputs a correct write address by comparing the error code value CDQ obtained by the calculation circuit 151 with the expected value CDEX.

Although an example is described above in which the calculation circuit 151 obtains an error code value based on a write address, the calculation circuit 151 may obtain the error code value based on a movement destination coordinate. In addition, similar to the second configuration example, the image conversion circuit 130 may switch a correction parameter in a vertical blanking period, and the error detection circuit 150 may execute error detection using an expected value corresponding to the correction parameter.

The above-described circuit device according to the present embodiment includes a storage circuit, an image conversion circuit, and an error detection circuit. The storage circuit stores received first image data. The image conversion circuit executes an image conversion by a coordinate conversion on the first image data by outputting a reference coordinate indicating a pixel position on the first image data and outputting second image data based on pixel data that is read from the storage circuit based on the output reference coordinate. The error detection circuit executes the error detection on the reference coordinate output by the image conversion circuit.

According to the present embodiment, the error detection is executed on the reference coordinate output by the image conversion circuit, so that whether the reference coordinate output by the image conversion circuit is correct is checked with high accuracy. Accordingly, it is possible to detect an abnormality in the image conversion circuit with high accuracy.

In the present embodiment, the error detection circuit may execute the error detection by comparing an error code value obtained based on the reference coordinate output by the image conversion circuit with an expected value of the error code value.

According to the present embodiment, whether the reference coordinate output by the image conversion circuit is correct is checked by comparing the error code value obtained based on the reference coordinate with the expected value of the error code value. Since the reference coordinate is a real value, it can be expected that accuracy of the error detection is higher when the error detection is executed on the reference coordinate, as compared with a case in which the error detection is executed after a conversion to a read address which is an integer value.

In the present embodiment, the circuit device may include a coordinate address conversion circuit. The coordinate address conversion circuit may convert the reference coordinate output by the image conversion circuit into the read address of the storage circuit. The error detection circuit may execute the error detection by comparing the error code value obtained based on the read address output by the coordinate address conversion circuit with an expected value of the error code value.

According to the present embodiment, whether the reference coordinate output by the image conversion circuit is correct is checked by comparing the error code value obtained based on the read address with the expected value of the error code value. The error detection is executed in a subsequent stage of the coordinate address conversion circuit, and thus not only an abnormality in the image conversion circuit but also an abnormality in the coordinate address conversion circuit can be detected as compared with a case in which the error detection is executed on the reference coordinate.

In the present embodiment, in the image conversion, the coordinate address conversion circuit may output a plurality of read addresses corresponding to a plurality of pieces of pixel data used in an interpolation operation. The error detection circuit may execute the error detection by comparing error code values obtained based on the plurality of read addresses with expected values.

According to the present embodiment, errors in the plurality of read addresses corresponding to the plurality of pieces of pixel data used in the interpolation operation can be collectively detected by comparing the error code values with the expected values.

In the present embodiment, in the image conversion, the coordinate address conversion circuit may output the plurality of read addresses corresponding to the plurality of pieces of pixel data used in the interpolation operation. The error detection circuit may execute the error detection by comparing an error code value obtained based on a representative read address among the plurality of read addresses with an expected value.

According to the present embodiment, the error code value is calculated based on the representative read address alone, and thus a calculation load of the error code value is reduced.

In the present embodiment, the circuit device may include an interface circuit that acquires the expected value.

According to the present embodiment, an expected value corresponding to a correction parameter can be input to the circuit device from an outside of the circuit device. The correction parameter differs depending on what type of coordinate conversion is executed, and the expected value according to the correction parameter can be set from the outside of the circuit device.

In the present embodiment, the interface circuit may acquire the expected value that is associated with the correction parameter representing the coordinate conversion. The image conversion circuit may output the reference coordinate based on the correction parameter. The error detection circuit may execute the error detection using the expected value associated with the correction parameter.

According to the present embodiment, the error detection circuit calculates the error code value based on the reference coordinate output based on the correction parameter, and compares the error code value with the expected value associated with the correction parameter. Accordingly, whether the reference coordinate output based on the correction parameter is correct can be checked.

In the present embodiment, the coordinate conversion is a coordinate conversion in distortion correction of an image or scaling of an image.

The distortion correction and the scaling are image conversions accompanied by the coordinate conversion. It is possible to detect an a abnormality in the image conversion circuit by detecting an error for the reference coordinate output by the image conversion circuit in the coordinate conversion.

In the present embodiment, the error detection circuit may execute the error detection by CRC.

According to the present embodiment, a CRC code can be obtained by the error detection circuit sequentially executing an encoding operation on the reference coordinates sequentially output by the image conversion circuit. In addition, it is possible to execute the error detection with higher accuracy using the CRC.

In addition, an error detection method according to the present embodiment includes storing first image data in a storage circuit. The error detection method includes executing an image conversion by a coordinate conversion on the first image data and outputting second image data after the image conversion. The error detection method includes, in the image conversion, outputting a reference coordinate indicating a pixel position on the first image data and outputting the second image data based on pixel data that is read from the storage circuit based on the output reference coordinate. The error detection method includes executing error detection on the output reference coordinate.

Although the present embodiment has been described in detail above, it will be easily understood by a person skilled in the art that many modifications can be made without substantially departing from the novel matters and effects according to the present disclosure. Therefore, all such modifications are intended to be included within the scope of the present disclosure. For example, a term cited with a different term having a broader meaning or the same meaning at least once in the description or in the drawings can be replaced with the different term in any place in the description or in the drawings. All combinations of the present embodiment and the modifications are also included in the scope of the present disclosure. Further, the configurations, operations, and the like of the error detection circuit, the circuit device, the processing device, or the like are not limited to those described in the present embodiment, and various modifications can be made.

What is claimed is:

1. A circuit device comprising:
 a storage circuit configured to store received first image data and an expected error code value, the expected error code value being calculated in advance;
 an image conversion circuit configured to execute an image conversion by a coordinate conversion on the first image data by outputting a reference coordinate indicating a pixel position on the first image data and outputting second image data based on pixel data that is read from the storage circuit based on the output reference coordinate, the reference coordinate further indicating a corresponding pixel position on the second image data; and an error detection circuit configured to execute error detection by comparing between a code value of the reference coordinate and the expected error code value.

2. The circuit device according to claim 1, further comprising:

a coordinate address conversion circuit configured to convert the reference coordinate output by the image conversion circuit into a read address of the storage circuit, wherein the error detection circuit is configured to execute the error detection by comparing an error code value obtained based on the read address output by the coordinate address conversion circuit with the expected error code value.

3. The circuit device according to claim 2, wherein the coordinate address conversion circuit is configured to output a plurality of read addresses corresponding to a plurality of pieces of pixel data used for an interpolation operation in the image conversion, and the error detection circuit is configured to execute the error detection by comparing the error code value obtained based on the plurality of read addresses with the expected error code value.

4. The circuit device according to claim 2, wherein the coordinate address conversion circuit is configured to output a plurality of read addresses corresponding to a plurality of pieces of pixel data used for an interpolation operation in the image conversion, and the error detection circuit is configured to execute the error detection by comparing the error code value obtained based on a representative read address among the plurality of read addresses with the expected error code value.

5. The circuit device according to claim 1, further comprising:

an interface circuit configured to acquire the expected error code value.

6. The circuit device according to claim 5, wherein the interface circuit is configured to acquire the expected error code value that is associated with a correction parameter representing the coordinate conversion, the image conversion circuit is configured to output the reference coordinate based on the correction parameter, and the error detection circuit is configured to execute the error detection using the expected error code value associated with the correction parameter.

7. The circuit device according to claim 1, wherein the coordinate conversion is a coordinate conversion in distortion correction of an image or scaling of an image.

8. The circuit device according to claim 1, wherein the error detection circuit is configured to execute the error detection by cyclic redundancy check (CRC).

9. An error detection method comprising:

storing first image data and an expected error code value in a storage circuit, the expected error code value being calculated in advance;

executing an image conversion by a coordinate conversion on the first image data and outputting second image data after the image conversion;

in the image conversion, outputting a reference coordinate indicating a pixel position on the first image data and outputting the second image data based on pixel data that is read from the storage circuit based on the output reference coordinate, the reference coordinate further indicating a corresponding pixel position on the second image data; and executing error detection by comparing between a code value of the reference coordinate and the expected error code value.

* * * * *